United States Patent [19]

Medansky

[11] Patent Number: 4,475,861

[45] Date of Patent: Oct. 9, 1984

[54] AUTOMOBILE OCCUPANT HOIST

[76] Inventor: Roland S. Medansky, 8900 Karlov Ave., Skokie, Ill. 60076

[21] Appl. No.: 441,609

[22] Filed: Nov. 15, 1982

[51] Int. Cl.[3] .............................................. B60N 1/12

[52] U.S. Cl. .................................... 414/462; 280/727; 414/539; 414/921

[58] Field of Search ................ 280/727, 733; 414/921, 414/539-542, 462

[56] References Cited

U.S. PATENT DOCUMENTS

| | | | |
|---|---|---|---|
| 2,650,725 | 9/1953 | Hoyer et al. | 414/921 |
| 2,793,768 | 5/1957 | Schaedler | 414/921 |
| 2,846,091 | 8/1958 | Heffner | 414/921 |
| 3,172,551 | 3/1965 | Wolfe | 414/921 |
| 4,278,387 | 7/1981 | Seguela et al. | 414/921 |

*Primary Examiner*—Richard A. Bertsch

*Attorney, Agent, or Firm*—Trexler, Bushnell & Wolters, Ltd.

[57] ABSTRACT

An automobile occupant hoist is provided for aiding a disabled or crippled person in entering or exiting an automobile. The hoist is disposed entirely inside the car for traveling and is extensible by means of an electric motor drive to project outside of the car with the door open. A transverse bar is provided which is parallel to the body of the car and which may be gripped by the occupant so that he may swing himself in or out of the car. The bar is optionally provided with hangers for engagement with a harness worn by the disabled person if he is physically unable to manually pull himself in and out of the car.

12 Claims, 5 Drawing Figures

FIG. 1
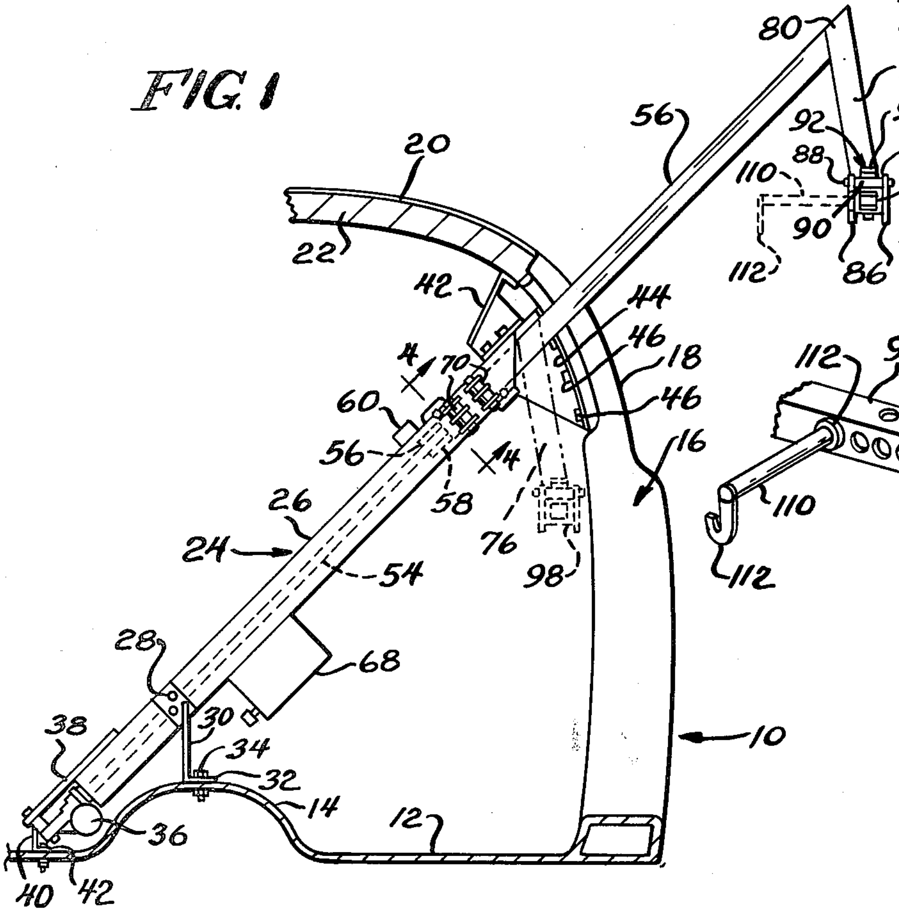
FIG. 3
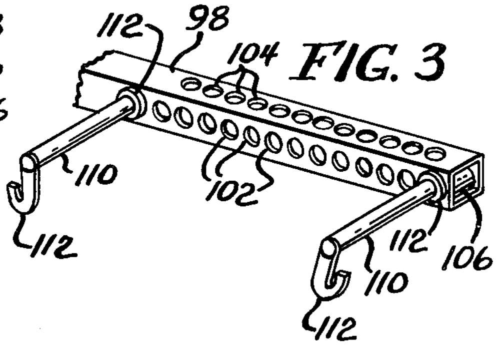
FIG. 2
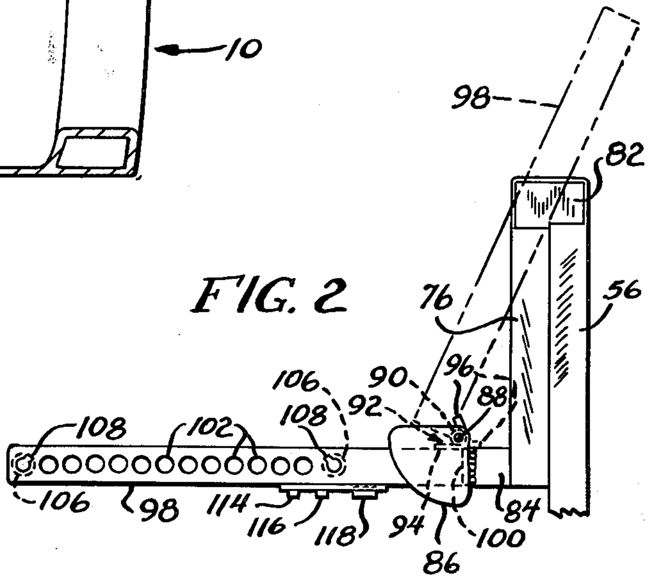
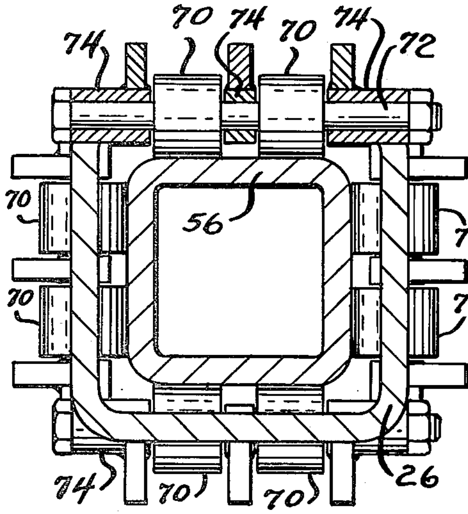
FIG. 4
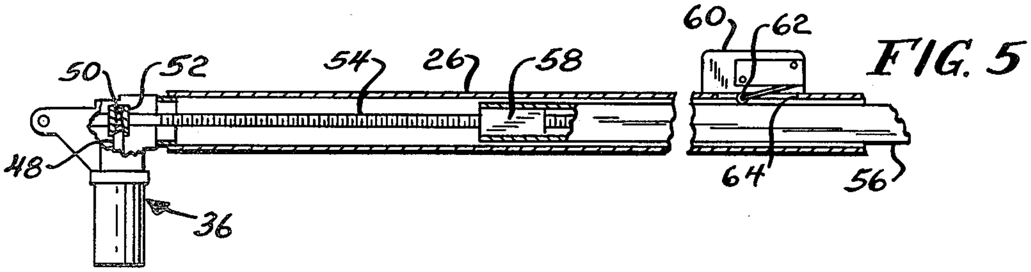
FIG. 5

AUTOMOBILE OCCUPANT HOIST

BACKGROUND OF THE INVENTION

There are many people who are disabled or crippled in some manner who are capable of riding in or even driving an automobile, but who cannot without aid enter or exit an automobile. Such people may range from paraplegics who have excellent arm and upper body strength, but no control over muscles below the waist to persons suffering from arthritis or other degenerative diseases who may be incapable of exerting much physical strength.

The only commercially available hoist for aiding occupants to enter and exit from an automobile is known as a Hoyer unit. This unit mounts on top of the roof of an automobile, and hence is exposed to inclement weather which may render the device inoperative due to ice and snow, and which tends to shorten the life and produce malfunctions of the device. Furthermore, holes are made in the roof of the automobile, and if the device is removed for selling the car, there are holes in the roof which are not readily patched, and which always show.

OBJECTS AND SUMMARY OF THE PRESENT INVENTION

It is an object of the present invention to provide an occupant hoist for an automobile which is mounted entirely inside of the automobile for traveling, thus being protected against inclement weather.

It is a further object of the present invention to provide such an occupant hoist which is mounted inside of the automobile and in which all of the fastening or mounting devices for the hoist are mounted in the floor or door post where holes left upon removing the hoist are readily patched and covered so as to be invisible.

Yet another object of the present invention is to provide an automobile occupant hoist having a bar running longitudinally of the body, which bar at rest position is inside the automobile, and which in extended position is disposed outwardly of the automobile body and at a greater elevation for manual gripping by a person to lift himself in or out of an automobile.

In achieving the foregoing and other objects I provide an automobile occupant hoist which includes a frame or cylinder of square or rectangular section mounted within the automobile in diagonal position, being secured by appropriate brackets to the floor, to the driveshaft tunnel, and to the door post. An extensible arm is mounted within the frame and is extendible and retractable by means of an electric motor and suitable gearing. The extensible arm has a depending arm which carries a pivoted horizontal arm which at rest is in the automobile body. When the door is open and the electric motor is run the extensible arm is extended, and moves the horizontal arm upwardly and outwardly away from the automobile body so that it may be manually grasped by a user to swing himself in or out of the automobile. Optionally, hangers may be provided on the bar for engagement with a harness worn by the user so that the user may be actively hoisted out of or lowered into the automobile seat. With a reversal of certain parts of the apparatus, it may be used in conjunction with the driver's seat, or in conjunction with a passenger seat.

THE DRAWINGS

FIG. 1 comprises a view of a hoist constructed in accordance with the principals of the present invention and mounted in an automobile, the view being partly in cross-section through the automobile.

FIG. 2 is a fragmentary side view of a portion of the hoist as taken along the line 2—2 in FIG. 1;

FIG. 3 is a fragmentary perspective view showing optional hangers for association with a harness worn by the user;

FIG. 4 is an enlarged cross-sectional view taken substantially along the line 4—4 in FIG. 1 and, FIG. 5 is a longitudinal sectional view taken through the hoist body or frame.

DETAILED DESCRIPTION OF THE ILLUSTRATED EMBODIMENT

Referring now in greater particularity to the drawings, and first to FIG. 1, there is shown a portion of an automobile body 10. Automobile bodies vary quite a bit in size and shape, but conventionally include a floor pan 12 with a driveshaft tunnel 14. The body also includes a door opening 16 which is closed by a door (not shown) during operation of the automobile, and which has a door post 18 at the rear thereof. The door post 18 extends in to a roof 20 having underlying insulating material 22.

A vehicle occupant hoist 24 constructed in accordance with the present invention is shown installed in the auto body 10 transversely of the auto body at approximately a 45 degree angle relative to the horizontal. The actual angle may vary somewhat in accordance with the contours and proportions of the auto body. The hoist 24 includes a frame or body 26 in the form of a tube or cylinder of square cross-section. A bracket 28 is fixed to the body 26 near the lower end thereof and has a depending portion at 30 with a flange 32 thereon secured to the driveshaft tunnel by means such as nuts and bolts 34. The bracket 28 may be bolted to the body 26, or preferably secured thereto by welding.

At the lower end of the body 26 there is an electric motor 36 secured to the body by suitable means including a bracket 38. The bracket 38 has a depending portion 40 with a foot or flange 42 thereon secured to the floor pan 12 by means of a nut and bolt fastener. At the upper end of the body 26 suitable brackets 42 and 44 are secured to the door post by means of volts or other screw threaded fasteners. Forces on the bolts at this position are mainly downwardly of the door post transversely of the bolts, there being substantially no axial force on the bolts. Accordingly, bolts 46 of the self tapping type will generally be found to be sufficient since the sheet metal into which they are turned is relatively heavy. If necessary suitable nut means can be applied by means well known in the automobile fastening industry.

As will be apparent, the floor pan is generally covered by carpeting, while the door post is generally covered by fabric or plastic portions. Accordingly, if the hoist is removed for sale of the car the holes in the metal are readily patched, and are covered by patches of carpet, or or simply flattening the nap of the carpet, with suitable like patches in the fabric or plastic covering the door post. Thus, there are no unsightly, more or less permanent holes made in the automobile rendering it unfit for further use.

The electric motor 36 may or may not include reduction gearing, but has an output shaft 48 (FIG. 5) having a worm 50 on the end thereof driving a worm wheel or gear 52 fixed to a rotatable shaft 54 lying on the axial center line of the body 26. An extensible arm 56 of square cross-section is axially moveable within the body 26 and has fixed at its lower end a nut 58 whereby rotation of the threaded rod or shaft 54 in one direction or the other causes the arm 56 to move telescopically out of or into the body 26.

A short travel switch 60 is mounted on the body 26 generally toward the upper end thereof and has a switch operating arm 62 extending through an opening 64 in the body 26, whereby when the arm 56 reaches its fully extended position the arm 62 drops off the lower end of the extensible arm 56 to interrupt operation of the motor 36 to limit the extended position of the arm 56. A depression or notch (not shown) is provided adjacent the upper end of the extensible arm 56 to cooperate with the switch actuator arm 62 to limit retraction of the extensible arm 56. An electrical control box, 68 is mounted on the underside of the body 26 adjacent the lower end thereof and contains wiring and relays for controlling operation of the motor 36 in conjunction with the low travel switch 60 and other switch means to be disclosed hereinafter.

The extensible arm 56 is journaled or supported in the body 26 adjacent the upper end of the body by means of four sets (one for each wall of the body 26) of axially spaced rollers 70. The rollers 70 are mounted on pins 72 suitably carried from the sides of the body 26, suitable recesses being provided, and there being appropriate spacers 74 for the rollers. The rollers bear against the four surfaces of the extensible arm 56 to provide for low friction extension and retraction of the arm 56.

At the upper end of the extensible arm 56 there is provided a diagonal depending arm 76 forming a shallow angle with the vertical whereby the lower end 78 thereof extends outwardly of the upper end 80 relative to the automobile body 10. The depending arm 76 is secured to the extensible arm 56 by welding, being reinforced by a plate 82 at the upper end.

A stub arm 84 of square cross-section extends forwardly from the bottom end of the depending arm 76 to which it is welded or otherwise suitably secured. A stub arm 84 is of square cross-section and has the top and bottom surfaces thereof parallel to the ground. Two flanges 86 of substantially 90 degree pie shape are welded to opposite vertical faces of the stub arm 84 relatively adjacent the right edges of the flanges as viewed in FIG. 2. A pivot pin 88 extends between the flanges at the upper right corners thereof. A pivot sleeve 90 pivotally encircles the pin 88 and has welded thereto a V-shaped metal strap 92 having a horizontal arm 94 and an upright arm 96, the included angle between the arms being somewhat less than 90 degrees.

An elongated support arm 98 of square cross-section is welded or otherwise suitably secured adjacent one end to the underface of the horizontal arm 94 of the strap 92 with the end of the support arm 98 abutting the end of the stub arm 84 at 100. Abutment of the ends together at 100 limits the arm 98 to a horizontal position as shown in solid lines at FIG. 2 and also as shown in FIG. 1, while engagement of the generally upright arm 96 of the strap 92 with the top surface of the stub arm 84 limits the pivoting of the support arm 98 to somewhat past vertical, as shown in broken lines in FIG. 2.

In rest or traveling position, the extensible arm 56 is retracted and the depending arm 76 and support arm 98 are disposed within the automobile, as shown in broken lines in FIG. 1. When the hoist is to be used for entering or leaving the automobile the arm 56 is extended, and the support arm 98 is disposed outwardly of the automobile and at an elevated location as shown in solid lines in FIG. 1.

As heretofore noted, there are some persons who do not have the requisite arm and upper body strength, or who may have restricted arm movement due to arthritis, for example, who are not capable of grasping the support bar 98 to lift themselves in or out of the automobile. For this purpose I have provided lifting hooks as shown in FIG. 3 and in broken lines in FIG. 1 which may be used in conjunction with a harness worn by the person for power lifting or lowering of the person.

The support arm 98 is provided with a plurality of apertures 102 in the side walls and a like plurality of apertures 104 in the top and bottom walls for weight reduction. The vertical side walls of the support arm 98 are provided with two extra pairs of apertures respectively at the opposite ends of the rows of apertures which receive sleeves 106. The sleeves are slotted longitudinally at 108 (FIG. 2) rotationally offset from straight up, and hanger rods 110 (FIG. 3) are inserted through these sleeves. The rods are provided adjacent their entering ends with radially disposed pins or other protuberances which will fit through the slots 108 with the rods 110 rotated slightly, insertion being limited by peripherial surfaces 112 on the rods which abut against a vertical face of the support arm 98. Subsequent rotation of the rods to bring the pins or protuberances into vertical position insures against undesired retraction of the rods. Depending hooks, 112 are provided on the ends of the rods 110 for association with the harness previously referred to.

On the underside of the support arm 98 and readily manually engaged by a user there are provided electrical push button switches 114 and 116 for starting the motor 36 in operation to extend or retract the extensive arm 56. Following such starting and with the follower arm 62 of the switch 60 in raised position by engagement with the upper surface of the extensible arm 56 the motor continues to run until complete extension or retraction is effected, stopping being controlled by the switch 60. A rocker switch operator 118 also is provided for incrementally extending or retracting the extensible arm 56 to determine the exact position wanted for the support arm 98.

The manner in which the occupant hoist is secured to an automobile has now been set forth. This is exemplary for the driver's side of the automobile, but it will be apparent that with some reversal of parts the hoist could equally well be used on the passenger's side. Attachment to the automobile effects very little defacement of the automobile, and such defacement can readily be covered if the hoist is removed, as for sale of the automobile. The hoist is mounted entirely within the automobile for traveling, thereby is not exposed to the deteriorating and sometimes disabling effects of the weather. Little battery current is required to run the motor 36, being essentially negligible in view of the power of modern automobile batteries. During travel the support arm 98 is practically under the driver's elbow or forearm, whereby the switches 114, 116 are readily accessible to him for raising the arm through extension of the extensible arm 56 after the automobile door has been opened. The driver can then simply reach up to the support arm and swing himself out and onto a wheelchair. Entrance is essentially the opposite, with the user grasping the support arm to swing himself from the wheelchair into the driver's seat of the automobile. In case the user is not strong enough or mobile enough to swing himself in and out the hooks 112 are connected to a harness worn by the user, either over or under clothing, whereby the motor 36 can be used to shift the user laterally and to raise and lower him by the power operation of the hoist. In this connection it will be realized that the wheelchair exterior of the automobile should have its seat at a greater elevation than the automobile seat. This is not particularly difficult in view of the low seating of most modern automobiles, and may be augmented by placing the wheelchair on a curb or an elevated platform.

In pleasant weather and with the type of automobile having no door portion surrounding the window it is possible to travel with the window open and the support arm in the near vertical position illustrated in broken lines in FIG. 2. Some users may prefer this as leaving somewhat more elbow room for the driver.

The hoist generally does not reduce the passenger carrying capacity of the automobile; a passenger can sit in the rear seat behind the hoist with his knees and legs below the diagonally disposed body thereof, whereby this seating position is not lost.

The specific example of the invention as herein shown and described is for illustrative purposes only. Various changes in structure will no doubt occur to those skilled in the art, and will be understood as forming a part of the present invention insofar as they fall within the spirit and scope of the appended claims.

The invention is claimed as follows:

1. An automobile occupant hoist for entrance and exit of a handicapped occupant and for use with an automobile having a floor and a door post and a door openable from said post comprising: an elongated body, bracket means for mounting said body to said floor and said door post in fixed diagonal position transversely of said automobile, said body having an upper end adjacent the side of the automobile used for entrance and exit of said occupant, an extensible arm telescopically and non-rotatably mounted in said body and extending from the upper end coaxially thereof, power means for extending and retracting said extensible arm, said arm moving up and down and out of and into said automobile, a support arm extending substantially longitudinally of said automobile, and means for mounting said support arm from said extensible arm, all of said hoist being disposed within said automobile with said extensible arm retracted.

2. A hoist as set forth in claim 1 wherein the means for mounting the support arm comprises an arm depending from the extending end of said extensible arm.

3. A hoist as set forth in claim 2 wherein said depending arm forms an angle with the vertical relatively outwardly of said automobile from top to bottom of said depending arm and carries said supporting arm outwardly of the end of said extensible arm.

4. A hoist as set forth in claim 1 wherein said power means comprises a reversable electric motor.

5. A hoist as set forth in claim 4 wherein said power means further includes an elongated screw member turned by said motor and a nut on said screw means and fixed to said extensible arm.

6. A hoist as set forth in claim 1 wherein said support arm is pivotable between substantially horizontal position and near vertical position.

7. A hoist as set forth in claim 6 wherein said support arm pivots past vertical position, and further including stop means for limiting the past vertical position of said support arm.

8. A hoist as set forth in claim 1 and further including means on said support arm for attachment to a harness worn by a user.

9. A hoist as set forth in claim 8 wherein said attachment means includes a plurality of hooks.

10. A hoist as set forth in claim 1 wherein said body has a predetermined cross-section of polygonal shape and said extensible arm has a predetermined cross-section of similar polygonal shape but of smaller cross-section, said extensible arm being telescopically received within said body.

11. A hoist as set forth in claim 10 wherein said predetermined cross-section is rectangular.

12. A hoist as set forth in claim 10 or in claim 11 and further including a plurality of rollers carried by said body and engaging said extensible arm.

* * * * *